UNITED STATES PATENT OFFICE.

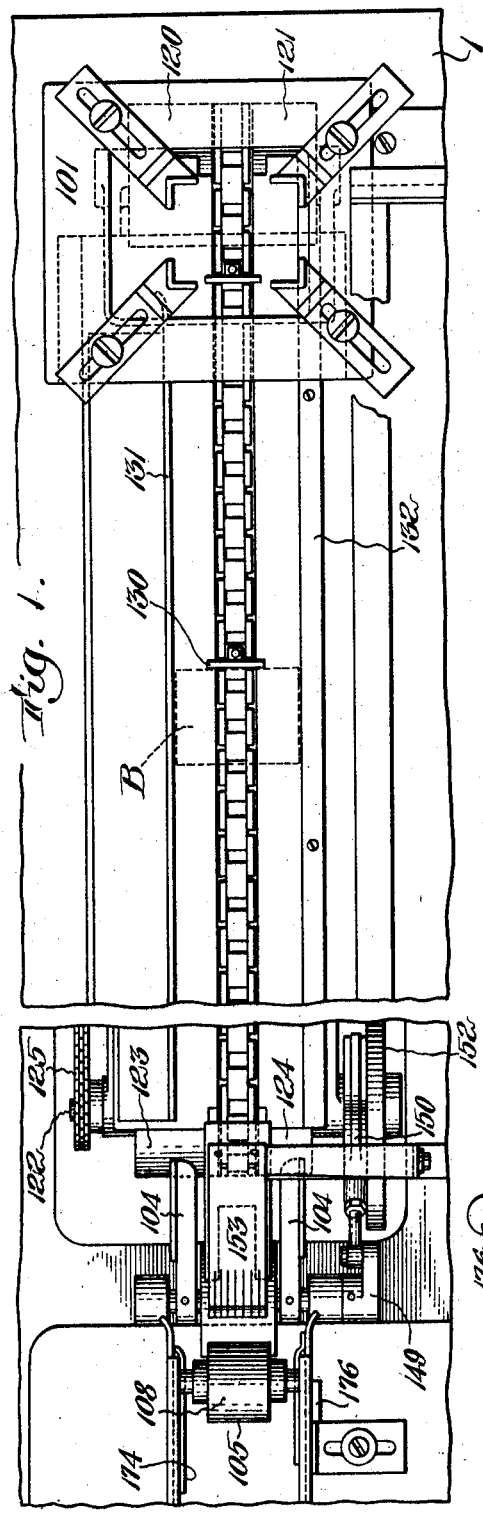

JAMES N. TZIBIDES, OF NEW YORK, N. Y., AND RILEY HERBERT PARKER, OF WINTHROP, MASSACHUSETTS; SAID PARKER ASSIGNOR TO SAID TZIBIDES.

CONVEYING AND STACKING MECHANISM.

1,350,393.     Specification of Letters Patent.     Patented Aug. 24, 1920.

Original application filed February 19, 1915, Serial No. 9,232. Divided and this application filed March 2, 1918. Serial No. 219,975.

*To all whom it may concern:*

Be it known that we, JAMES N. TZIBIDES, a subject of the King of Greece, and resident of New York, in the county and State of New York, and RILEY HERBERT PARKER, a citizen of the United States, and resident of Winthrop, in the county of Suffolk and Commonwealth of Massachusetts, have invented new and useful Improvements in Conveying and Stacking Mechanism, of which the following is a specification.

This invention relates to conveying and stacking mechanism and more particularly to mechanism for conveying and stacking boxes, this application being a division of our former application Sr. No. 9232, filed February 19, 1915.

In many situations it is desirable to convey articles from one point to another and to stack the articles in orderly fashion. As disclosed in our aforesaid application, for example, the application of revenue stamps to cigarette boxes is greatly facilitated by carrying the boxes along a traveling conveyer so that the stamps may be applied as the boxes travel along with the conveyer and the subsequent packing or other disposition of the boxes is greatly expedited by automatically depositing the boxes in rows as they leave the conveyer.

The principal object of the present invention, therefore, is to provide improved mechanism for conveying and stacking articles such as cigarette boxes. The articles may be supplied to the conveyer in either regular or irregular order but where it is desired to have them travel on the conveyer in a definite position, as in the case of cigarette boxes, they are preferably fed to the conveyer in regular order from a magazine. Where it is not essential that the articles occupy a particular position relatively to the conveyer they may be fed to the conveyer through a hopper in which case the mechanism functions primarily or exclusively as a means for stacking the boxes in orderly fashion.

Other objects of the invention will be apparent from the following description and the accompanying drawings, in which—

Figure 1 is a plan view of the preferred embodiment of the invention; and

Fig. 2 is a vertical longitudinal section of the embodiment shown in Fig. 1.

For the purpose of showing one use of the present invention we have illustrated it as adapted to applying stamps to cigarette boxes or the like, and we shall now proceed to describe the illustrated embodiment as thus adapted, it being understood that the conveying and stacking mechanism forming the subject-matter of the invention is not limited to this particular use but is capable of a wide variety of applications.

Upon a table 1 is mounted a traveling conveyer in the form of a chain 100 passing over sprocket wheels 114 and 115 at opposite ends of the table, the sprocket wheels being fixed to shafts 122 and 119 journaled in the table. Shaft 119 carries two rolls 120 and 121 between which the sprocket 115 is arranged and a similar pair of rolls 123 and 124 is carried by a shaft 122 on opposite sides of sprocket 114. The top stretch of the conveyer 100 is supported by a bed or guideway 116 secured to the top of table 1 with provision for vertical adjustment by means of screws 117 and 118.

The magazine 101, which is preferably provided at the right-hand end of the machine to support the boxes of cigarettes in the form of a stack, consists of four upright angle metal members which engage the four corners of the boxes B. The upright angle members are provided at their base portion with a slot engaging a screw in the magazine base, by which means the angle members may be readily moved and adjusted to inclose boxes of various dimensions and then locked in position by the screws. The stack of boxes B rests on one end of the guideway 116, and the boxes are fed forward one by one from the bottom of the stack by means of lugs 130 provided at intervals on the conveyer 100. The lugs 130 push the boxes one at a time out from the bottom of the magazine 101, and slide them forward along the guideway 116 between the two guidewalls 131 and 132.

As the boxes are carried along the guideway 116 revenue stamps may be applied thereto by hand or in any other suitable manner. In our prior application above referred to we have disclosed means for automatically applying the stamps but inasmuch as the present invention is independent of the stamp-applying mechanism such mechanism has not been illustrated herein.

Our improved stacker mechanism is disposed at the delivery end of the conveyer and is adapted to lift the boxes from the conveyer and deposit them upon the support 106 which is disposed somewhat above the level of the conveyer. The stacker mechanism comprises a pair of oscillating arms 104 mounted on shaft 148 substantially in alinement with the path of travel of the boxes on the conveyer. The stacker arms 104 are fixed to shaft 148 and are oscillated by an arm 149 on shaft 148. Arm 149 is connected by forked arm 150, which straddles shaft 122, with a cam 152, which is engaged by cam roll 151 on arm 150. The cam 152 is fast on shaft 122 and is so timed as to hold the arms 104 in an approximately horizontal position to receive the stamped boxes delivered from the end of the carrier 100. As soon as the arms 104 receive a box from the conveyer 100 the cam 152 swings the arm upward toward the end of the receiver 105, at the entrance of which they are held temporarily, until pushed along by succeeding boxes, by means of a spring shoe 153.

When employing our improved mechanism for the purpose of applying revenue stamps to cigarette boxes as herein described, auxiliary mechanism is preferably associated with the stacking mechanism to assist in applying the stamps. The auxiliary mechanism preferably comprises a spring presser foot 107 projecting over the path of travel of the boxes as they are being swung from the conveyer to the receiver and one or more rollers 108 journaled in bars 174 which are adjustably supported on uprights 176. The stamps are applied to the upper sides of the boxes as they travel along the conveyer and the stamps are so applied that they project rearwardly beyond the rear edges of the boxes. During the swinging of the boxes into upright position by the arms 104, the rearwardly extending ends of the stamps are swept under the spring presser foot 107 which folds the rearwardly projecting ends of the stamps over the narrow sides of the boxes and pastes them across the lines of division between the boxes and the lids. The rollers 108 exert further pressure on the folded-over ends of the stamps as the row of boxes passes underneath, thus further pressing the stamps into place and insuring the permanent adhesion of the stamp end to the boxes.

We claim:

1. Apparatus for stacking boxes comprising supporting means and means adapted to pick up the boxes, partially turn same, and redeposit the boxes in new positions, together with a conveyer and yielding means coöperating with guiding means external to the supporting means whereby the boxes are temporarily restrained and prevented from tipping over in their transit from the conveyer to the supporting means.

2. Apparatus for stacking boxes comprising supporting means, and means adapted to pick up the boxes from the supporting means, partially turn same, and redeposit the boxes in a row in a new position, together with a conveyer and yielding means coöperating with guiding means external to the supporting means whereby the boxes are temporarily restrained and prevented from tipping over in their transit from the conveyer to the supporting means.

3. Apparatus for stacking boxes comprising supporting means, and opposed arms rotatably mounted so as to pick up boxes and deposit same in a row on the supporting means, together with a conveyer and yielding means coöperating with guiding means external to the supporting means whereby the boxes are temporarily restrained and prevented from tipping over in their transit from the conveyer to the supporting means.

4. Apparatus for stacking boxes comprising a conveyer, a receiver disposed on a different level and oscillatory means adapted to engage opposite sides of a box on the conveyer and deposit it upon the receiver, together with yielding means coöperating with guiding means external to the receiver whereby boxes are temporarily restrained and prevented from tipping over in their transit from the conveyer to the receiver.

5. Apparatus for stacking boxes comprising a conveyer, a receiver disposed on a higher level, and means pivotally mounted at substantially the level of the conveyer for carrying boxes from the conveyer and depositing them in a row upon the receiver, together with yielding means coöperating with guiding means external to the receiver whereby boxes are temporarily restrained and prevented from tipping over in their transit from the conveyer to the receiver.

6. In a machine of the character described, the combination of a conveyer, a receiver near the conveyer and means adapted to engage the opposite sides of an article on the conveyer and carry same into the receiver, together with yielding means coöperating with downwardly curved guiding means external to the receiver whereby boxes are temporarily restrained therebetween and prevented from tipping over in their transit from the conveyer to the receiver.

7. In a machine of the character described, the combination of a conveyer, a receiver near the conveyer and oscillating arms adapted to engage the opposite sides of an article on the conveyer and carry same into the receiver, together with yielding means coöperating with downwardly curved guiding means external to the receiver whereby boxes are temporarily restrained therebetween and prevented from tipping over in their transit from the conveyer to the receiver.

8. In a machine of the character described, the combination of a conveyer, a receiver near the conveyer, and opposed arms rotatably mounted on opposite sides of the conveyer so as to engage the opposite ends of an article on the conveyer and carry same into the receiver, together with yielding means coöperating with downwardly curved guiding means external to the receiver whereby boxes are temporarily restrained therebetween and prevented from tipping over in their transit from the conveyer to the receiver.

9. In a machine of the character described, the combination of a traveling conveyer, a receiver at the delivery end of the conveyer, means pivotally mounted substantially in the plane of the path of travel of the conveyer for transferring articles from the conveyer to the receiver, together with yielding means coöperating with downwardly curved guiding means external to the receiver whereby boxes are temporarily restrained therebetween and prevented from tipping over in their transit from the conveyer to the receiver.

10. In a machine of the character described, the combination of a box conveyer, a receiver near the delivery end of the conveyer, and opposed arms pivotally mounted between the conveyer and the receiver so as to engage the opposite sides of a box on the conveyer and deposit it upon the receiver, together with yielding means coöperating with downwardly curved guiding means external to the receiver whereby boxes are temporarily restrained therebetween and prevented from tipping over in their transit from the conveyer to the receiver.

11. In a machine of the character described, the combination of a box conveyer, a receiver near the delivery end of the conveyer, and opposed arms pivotally mounted between the conveyer and the receiver so as to engage the opposite sides of a box on the conveyer, turn it into a new position, and deposit it upon the receiver, together with yielding means coöperating with downwardly curved, guiding means external to the receiver whereby boxes are temporarily restrained therebetween and prevented from tipping over in their transit from the conveyer to the receiver.

12. In a machine of the character described, the combination of a box conveyer, a receiver near the delivery end of the conveyer, and opposed arms pivotally mounted between the conveyer and the receiver substantially in alinement with the path of travel of boxes on the conveyer, the arms extending toward and along said path of travel when in one position so that a box on the conveyer will be carried therebetween, the arms being adapted to grip the box and carry it to the receiver, together with yielding means coöperating with downwardly curved guiding means external to the receiver whereby boxes are temporarily restrained therebetween and prevented from tipping over in their transit from the conveyer to the receiver.

13. In a machine of the character described, the combination of a box conveyer, a receiver near the delivery end of the conveyer and opposed arms pivotally mounted at said end on opposite sides of the path of travel of boxes on the conveyer so as to engage the opposite ends of boxes traveling flatwise on the conveyer and deposit same edgewise on the receiver, together with yielding means coöperating with downwardly curved guiding means external to the receiver whereby boxes are temporarily restrained therebetween and prevented from tipping over in their transit from the conveyer to the receiver.

14. In a machine of the character described, the combination of a box conveyer, a receiver near the delivery end of the conveyer, opposed arms pivotally mounted at said end on opposite sides of the path of travel of boxes on the conveyer so as to engage the opposite ends of boxes traveling flatwise on the conveyer and deposit same edgewise in a row on the receiver, together with yielding means coöperating with downwardly curved guiding means external to the receiver whereby boxes are temporarily restrained therebetween and prevented from tipping over in their transit from the conveyer to the receiver.

15. In a machine of the character described, the combination of a box conveyer, a drive shaft for said conveyer, a receiver near the delivery end of said conveyer, opposed arms pivotally mounted between the conveyer and the receiver so as to engage the opposite ends of a box on the conveyer and deposit it upon the receiver, a cam upon said drive shaft for oscillating said arms, together with yielding means coöperating with downwardly curved guiding means external to the receiver whereby boxes are temporarily restrained therebetween and prevented from tipping over in their transit from the conveyer to the receiver.

16. In a machine of the character described, the combination of a box conveyer, a drive shaft for said conveyer, a receiver near the delivery end of said conveyer, opposed arms pivotally mounted between the conveyer and the receiver so as to engage the opposite ends of boxes traveling flatwise on the conveyer and deposit same edgewise in a row on the receiver, together with yielding means coöperating with downwardly curved guiding means external to the receiver whereby boxes are temporarily restrained therebetween and prevented from tipping over in their transit from the conveyer to the receiver.

17. In a machine of the character described, the combination of a box conveyer, a receiver near the delivery end of the conveyer, opposed arms pivotally mounted between the conveyer and the receiver so as to engage the opposite sides of a box on the conveyer, turn it on edge, and deposit it upon the receiver, together with yielding means coöperating with downwardly curved guiding means external to the receiver whereby boxes are temporarily restrained therebetween and prevented from tipping over in their transit from the conveyer to the receiver.

18. Apparatus for stacking boxes comprising a support, a second support, means for transferring a box from the first support to the second support, and means for yieldingly engaging the box as it is deposited on the second support to prevent it from tipping over.

19. Apparatus for stacking boxes comprising a support, a second support, means for transferring a box from the first support to the second support, said means being arranged to turn the box and deposit it in a vertical position, and means for yieldingly engaging the box as it is deposited on the second support to prevent it from tipping over.

20. Apparatus for stacking boxes comprising a support, a second support, means for transferring a box from the first support to the second support, said means being arranged to turn the box and deposit it in a vertical position, and means for frictionally engaging the top of the box as it is deposited on the second support to prevent it from tipping over.

21. Apparatus for stacking boxes comprising a support, a belt conveyer arranged to advance toward said support at a lower level and then turn downwardly at a distance from the support, a pair of opposed arms pivoted below the edge of the support with the arms extending toward the advancing portion of the belt conveyer in substantial alinement therewith so that boxes carried flatwise on the conveyer will be carried between said arms as the belt turns downwardly, means to rotate the arms upwardly into position to deposit the boxes on said support, and means for engaging the boxes as they are deposited on said support to free the boxes from said arms.

Signed by JAMES N. TZIBIDES at New York, N. Y., this 25th day of Jany. 1918.

JAMES N. TZIBIDES.

Signed by RILEY HERBERT PARKER at Boston, Mass., this 12th day of November, 1917.

RILEY HERBERT PARKER.